(12) United States Patent
Rai et al.

(10) Patent No.: US 9,138,704 B2
(45) Date of Patent: Sep. 22, 2015

(54) SUSPENSION OF NANOPARTICLES

(75) Inventors: Beena Rai, Pune (IN); Pradip, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 67 days.

(21) Appl. No.: 13/983,522

(22) PCT Filed: Aug. 25, 2011

(86) PCT No.: PCT/IN2011/000576
§ 371 (c)(1),
(2), (4) Date: Nov. 11, 2013

(87) PCT Pub. No.: WO2012/104860
PCT Pub. Date: Aug. 9, 2012

(65) Prior Publication Data
US 2014/0056992 A1  Feb. 27, 2014

(30) Foreign Application Priority Data

Feb. 4, 2011 (IN) .......................... 319/MUM/2011

(51) Int. Cl.
*B82Y 30/00* (2011.01)
*B01F 17/00* (2006.01)
*C09C 1/36* (2006.01)

(52) U.S. Cl.
CPC ......... *B01F 17/0028* (2013.01); *B01F 17/0007* (2013.01); *B01F 17/0021* (2013.01); *B82Y 30/00* (2013.01); *C09C 1/3623* (2013.01); *C09C 1/3669* (2013.01); *C09C 1/3692* (2013.01); *C01P 2004/62* (2013.01); *C01P 2004/64* (2013.01); *C01P 2006/12* (2013.01); *C01P 2006/22* (2013.01); *Y10S 977/773* (2013.01)

(58) Field of Classification Search
None
See application file for complete search history.

(56) References Cited

U.S. PATENT DOCUMENTS

| 4,186,028 | A | 1/1980 | Woditsch et al. |
| 4,599,114 | A | 7/1986 | Atkinson |
| 6,139,617 | A | 10/2000 | Halko et al. |
| 8,357,426 | B2 | 1/2013 | Seeney et al. |
| 2005/0129634 | A1* | 6/2005 | Frerichs et al. ................. 424/59 |
| 2005/0184276 | A1* | 8/2005 | Nakazawa ................... 252/387 |
| 2005/0217427 | A1 | 10/2005 | Suthersan et al. |
| 2009/0140198 | A1* | 6/2009 | Lee et al. ..................... 252/79.1 |

OTHER PUBLICATIONS

H Gocmez, "The Interaction of ORganic Dispersant with Alumina: A Molecular Modelling Approach." Ceramics International, vol. 32, 2006, pp. 521-525.*
Fedele et al., "Experimental stability analysis of different water-based nanofluids," *Nanoscale Research Letters* 6:300 pp. 1-8, 2011.
Lu et al., "Theoretical analysis of colloidal interaction energy in nanoparticle suspensions," *Ceramics International* 34:1353-1360, 2008.
Singh et al., "Stability of dispersions of colloidal alumina particles in aqueous suspensions," *Journal of Colloid and Interface Science* 291:181-186, 2005.

* cited by examiner

*Primary Examiner* — Isaac Shomer
(74) *Attorney, Agent, or Firm* — Seed IP Law Group PLLC (57) ABSTRACT

A method for preparing suspension of inorganic nanoparticles is described herein. The method includes mixing a dispersing medium (102) with a dispersant (104) and a metal oxide powder (106) to form a primary mixture (110), the dispersant (104) being selected based on interaction energy of the dispersant (104) with respect to the dispersing medium (102) and the metal oxide powder (106). The method further includes grinding the primary mixture (110) to obtain a suspension (116), wherein at least the dispersant (104) is added to the primary mixture (110) during the grinding after predetermined time intervals.

7 Claims, 4 Drawing Sheets

SUSPENSION OF NANOPARTICLES

TECHNICAL FIELD

The present subject matter relates to methods of preparing suspensions and, particularly, but not exclusively, to methods of preparing suspensions of inorganic nanoparticles.

BACKGROUND

Generally, a particle having one or more dimensions of the order of 100 nanometer (nm) or less is referred as a nanoparticle. Nanoparticles, typically, inorganic nanoparticles, such as titanium dioxide nanoparticles and zinc oxide nanoparticles, are used in a variety of products, for example, in high grade paints, adhesives, tinting agents, solar cells, cosmetics, personal care, and health care products. Further, it may be required that the nanoparticles possess certain particular physical and chemical properties, such as a particular range of particle size, so that they can be used in the products. For example, nanoparticles are used as a pigment in paints for absorption, reflection, and scattering of visible light; and are used as anti-ultra violet (UV) agents for absorption, reflection, and scattering of UV radiations. In both the examples, absorption, reflection, and scattering depend primarily on particle size of the nanoparticles.

Various techniques of dispersing nanoparticles, such as, milling and ultra-sonication have been used conventionally to prepare suspensions of these nanoparticles. Typically, it is required that the suspensions include particles such that they remain dispersed for long durations. However, such techniques often fail to produce suspensions, which are stable for long durations, say, for several months or years. In other words, such techniques may provide suspensions where the nanoparticles agglomerate or form strong agglomerates that may require large amounts of energy for disintegration. Further, such techniques may facilitate only small scale production of suspensions of the nanoparticles.

SUMMARY

This summary is provided to introduce concepts related to methods for preparation of suspensions of inorganic nanoparticles and these concepts are further described below in the detailed description. This summary is neither intended to identify essential features of the claimed subject matter nor is it intended for use in determining or limiting the scope of the claimed subject matter.

In one embodiment of the present subject matter, method(s) for preparing suspension of inorganic nanoparticles are described. The method includes mixing a dispersing medium with a dispersant and a metal oxide powder to form a primary mixture and grinding the primary mixture to obtain a suspension, wherein at least the dispersant is added to the primary mixture during the grinding after predetermined time intervals. Further, the dispersant may be selected based on interaction energy of the dispersant with respect to the dispersing medium and the metal oxide powder. Furthermore, the metal oxide powder may include particles of at least one metal oxide having an average particle size in a range of about 0.1 microns to 100 microns.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of the method(s) in accordance with the present subject matter are described, by way of example only, and with reference to the accompanying figures, in which.

It should be appreciated by those skilled in the art that any block diagrams herein represent conceptual views of illustrative systems embodying the principles of the present subject matter.

DETAILED DESCRIPTION

Method(s) for preparing suspensions of inorganic nanoparticles are described herein. The methods described herein can be implemented for the preparation of suspensions of nanoparticles of a variety of metal oxides, for example oxides of metals, such as, titanium, iron, silicon, zirconium, and zinc. The suspensions of inorganic nanoparticles are used in a range of applications, for example, Titanium dioxide ($TiO_2$) or titania is used as white pigment in high grade paints, as fillers in adhesives to improve quality, in optically transparent UV-absorbing coatings and for photocatalysis to purify air and water and in antibacterial applications.

Various methods can be used for preparation of the suspension of the inorganic nanoparticles. For example, a suspension of nanoparticles of Titanium can be prepared by hydrolysis of titanyl sulfate via acid-base chemistry followed by calcinations, flame hydrolysis of titanium tetrachloride ($TiCl_4$), and hydrolysis of titanium oxide followed by a condensation reaction to produce titania particles. However, when the obtained nanoparticles are dispersed in a medium to make suspensions, the particles tend to agglomerate. Generally, further processing is required to make suitable suspensions, which may be used for their intended purpose.

According to an embodiment of the present subject matter, methods for preparing stable suspensions of inorganic nanoparticles are described herein. A stable suspension may be understood as a suspension in which inorganic nanoparticles either do not agglomerate for long durations, say, several months or years, or form weak agglomerates that may be disintegrated by imparting small energy. In one implementation, a metal oxide powder, a dispersing medium, and a dispersant are mixed to form a primary mixture. The average particle size in the metal oxide powder may be in the range of about 0.1-100 microns. The dispersing medium may be an aqueous medium or a non-aqueous medium.

Further, a dispersant may be understood as a substance added to a medium to promote uniform suspension of particles and prevent agglomeration. In one implementation, a dispersant is selected based on a measurement related to interaction of the dispersant with a given metal oxide powder and the dispersing medium. The interaction may be measured as the interaction energy of a given dispersant with surface of the metal oxide particles in the presence of the dispersing medium. The selection of a dispersant based on the interaction energy helps identify a dispersant that is strongly attracted to metal oxide particles surfaces, allowing strong dispersant absorption. Consequently, the metal oxide particles repel each other, which in turn prevents agglomeration. Examples of the dispersants that may be used include, but are not limited to, carboxylic acids, which may be aliphatic, aromatic, or polymeric acids, esters, ethers, alcohols, cellulose, sugar derivatives or any combination thereof.

The primary mixture is then ground to produce a suspension of nanoparticles. In an implementation, before grinding the primary mixture, the metal oxide powder and the dispersant are dispersed in the dispersing medium, for example, using magnetic stirring, to form a primary mixture slurry. This helps to evenly distribute the particles of metal oxide in the primary mixture and avoids agglomeration of the particles. It would be understood by those skilled in the art that different methods of dispersion known in the art, such as ultrasonication may also be used to disperse the primary mixture and to form a slurry of the primary mixture.

Subsequent to dispersion, the primary mixture may be ground to form a suspension of nanoparticles. In one implementation, the primary mixture is ground using wet milling techniques. The primary mixture may be ground till average particle size becomes of the order of 100 nm or less. Further, while the primary mixture is being ground, the dispersant and the dispersing medium may be added after predetermined time intervals to maintain the viscosity and state of dispersion. It will be understood that the dispersant and the dispersing medium may be added separately or as a mixture.

The suspension of the nanoparticles thus produced may contain a high concentration of nanoparticles and the concentration may vary between 10 to 40 wt % (weight percentage), where the concentration in weight percentage reflects the weight percentage of the metal oxide particles in the primary mixture. During the preparation of the primary mixture and the grinding process, addition of the dispersant, which is selected based on the interaction energy criteria, provides for a suspension that is stable for longer durations. Also, since the nanoparticles in the obtained suspension were formed by wet milling in the presence of the dispersant and dispersing medium, the nanoparticles do not tend to agglomerate. Further, the addition of dispersants during grinding, after predetermined time intervals, also provides additional stability and prevents agglomeration. Moreover, to prepare a stable suspension, various process parameters, such as grinding time, size of grinding medium, grinding medium to powder ratio, primary mixture slurry concentration, and the amount of dispersants may also be controlled and monitored.

In one implementation, the suspension may be diluted with the dispersant and the dispersing medium to obtain a diluted suspension of the nanoparticles. The diluted suspension formed may then also be dispersed using dispersion techniques known in the art, such as ultrasonication, and magnetic dispersion.

Since, a suitable dispersant is selected based on interaction energy criteria prior to the preparation of the suspension, multiple suspensions with different dispersants do not have to be prepared and checked for stability to finally identify a suitable dispersant. Thus, the present method provides for reduction in the cost of identifying a required dispersant to obtain a stable suspension of a given metal oxide. Further, the present method may also facilitate not only small scale production, but also commercial production of the suspensions of the metal oxide nanoparticles with reduced costs.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

While aspects of described methods for preparing stable suspension of the metal oxide nanoparticles can be implemented in any number of different production environments, and/or configurations, the embodiments are described in the context of the following environment(s).

Figure 1:
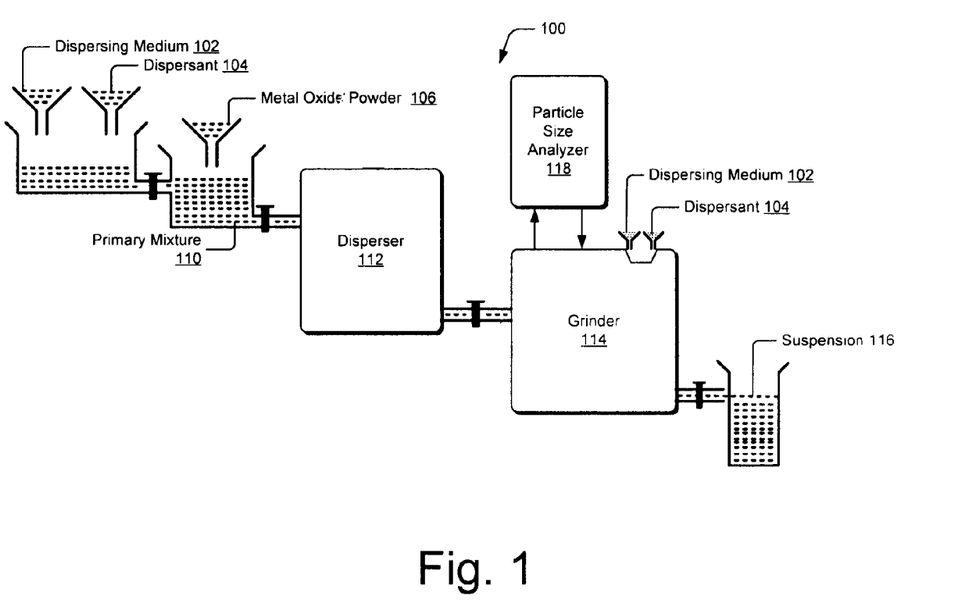
FIG. 1 illustrates a schematic block diagram representation of a system for preparation of suspension of inorganic nanoparticles, in accordance with an embodiment of the present subject matter.

FIG. 1 illustrates a block diagram representation of a system 100 for preparation of suspension of inorganic nanoparticles, according to an embodiment of the present subject matter. It will be understood that intermediate mixtures produced at different levels and stages of preparation of the suspension may be produced in different batches and in various quantities, as would be understood by those skilled in the art.

In one implementation, a dispersing medium 102, a dispersant 104, and a metal oxide powder 106 which may include particles of at least one metal oxide are mixed together to form a primary mixture 110. The metal oxide powder 106 may include oxides of metals, such as, titanium, iron, silicon, zirconium, and zinc. Further, it would be appreciated that in other implementations, the metal oxide powder 106 may include particles of metals, metal alloys, and combinations thereof. In an example, when the metal oxide powder 106 includes titanium dioxide, the metal oxide powder 106 may be rutile type or anatase type. In one implementation, average particle size of the metal oxide powder is greater than 100 nm, for example, in the range of about 0.1 to 1.0 microns. In an example of said implementation, average particle size of the metal oxide powder is in the range of about 0.5-0.7 microns.

Further, the dispersing medium 102 may be an aqueous solution or an organic solvent. Examples of the dispersing medium 102 include, but are not limited to, water, oils such as mineral turpentine oil; esters, such as aliphatic esters like ethyl or n-butyl acetate; alcohols, such as aliphatic alcohols like ethyl or propyl alcohol; glycols, or combination thereof.

Similarly, the dispersant 104 may be a suitable substance for the chosen dispersing medium 102 and may include, but is not limited to, carboxylic acids, esters, ethers, alcohols, sugar and its derivatives or polymers, phosphates, amines, and the like or combinations thereof. In one implementation, the dispersant 104 for the given dispersing medium 102 and the metal oxide powder 106 is selected based on interaction energy. In one implementation, the interaction energy may be computed using molecular modeling techniques. The molecular modeling techniques may be understood as theoretical or computational techniques used to quantify the interaction of dispersant molecules with the dispersing medium 102 and particle surface of the metal oxide in the metal oxide powder 106. For the purpose, any molecular modeling technique known in the art may be used. The interaction energy thus computed may be used to select a suitable dispersant 104 for the given dispersing medium 104 and the metal oxide powder 106. For example, from a set of multiple probable dispersants, a dispersant having highest negative interaction energy may be selected as the dispersant 104 for a given dispersing medium 102 and a metal oxide powder 106. In another example, the interaction energies may be determined experimentally.

For example, consider Citric acid, Lauric acid, Myristic acid, Palmitic acid, Stearic acid, and Oleic acid as probable dispersants that can be used to prepare a suspension of titanium dioxide in the presence of water as a dispersing medium. The interaction energy computed for each of the probable dispersants using material studio software from Accelrys® is depicted in table 1:

TABLE 1

| Dispersant | Interaction Energy (Kcal/mol) |
|---|---|
| Lauric acid | −19.59 |
| Myristic acid | −20.74 |
| Palmitic acid | −22.35 |
| Stearic acid | −24.83 |
| Oleic acid | −27.43 |
| Citric acid | −45.72 |

From the aforementioned table, it can be observed that Citric acid has the lowest interaction energy or to say has the most negative interaction energy and is therefore considered to be a suitable dispersant for preparing the suspension of titanium dioxide in the presence of water. In another implementation, other criteria, such as cost, may be used along with the interaction energy data to select the suitable dispersant.

As it is known, smaller is the particle size, larger is the surface area and in turn more intense are the Van der Waal's forces between the particles, in the present case, metal oxide particles. Further, owing to strong Van der Waal's forces, particles tend to drift towards each other and form agglomerates. However, addition of a suitable dispersant prevents agglomeration of the metal oxide particles in a suspension. The dispersant caps or coats the metal oxide particles such that the particles then tend to repel each other and, as a result, metal oxides stay dispersed in the suspension. Thus, in the absence of a suitable dispersant, the metal oxide particles do not remain dispersed for long durations and eventually agglomerate.

Therefore, if a dispersant is chosen such that its interaction energy with respect to a metal oxide surface in the presence of molecules of a dispersing medium is low, the dispersant molecules would embed themselves at interfaces between metal oxide particles and the dispersing medium molecules, thereby preventing agglomeration of the metal oxide particles.

Referring back to preparation of primary mixture 110, in one example, the primary mixture is prepared by mixing the dispersing medium 102 and the dispersant 104 with about 30-40 wt % of the metal oxide powder 106. In one implementation, to prevent agglomeration and precipitation of metal oxide particles, the primary mixture 110 is dispersed using a disperser 112. The disperser 112 may use any physical dispersing technique known in the art, such as ultrasonication, and magnetic stirring, for dispersing the primary mixture 110.

The dispersed primary mixture may be ground using a grinder 114 to reduce the particle size of metal oxide powder 106 to provide a suspension of metal oxide nanoparticles 116. However, it will be understood that the un-dispersed primary mixture 110 may also be directly ground by the grinder 114. In one implementation, the grinder 114 is a milling device, for example, a planetary ball mill, stirred media mill, attrition mill, and a bead mill. In one implementation, the primary mixture 110 may be ground using wet milling. Further, the grinder 114 may have multiple jars to receive and grind the primary mixture. Additionally, the grinder 114 includes a grinding medium, such as, Yttrium stabilized Zirconium Dioxide. During milling, various process parameters, such as the grinding time, grinding speed, size of grinding media, percentage filling of the jars, grinding media to metal oxide powder ratio, primary mixture concentration, and the amount of dispersants, may be controlled and monitored.

In an implementation, the average particle size of the grinding medium is in the range of about range of 0.4-3.3 millimeter (mm); the ratio of the grinding media and the metal oxide powder in the grinder 114 is in the range of about 16.67:1 to 40:1; percentage filling of the jars is in the range of about 50-70%; grinding time is in the range of about 30 minutes −24 hours; and grinding speed may be about 420 revolutions per minute (rpm). In an example of said implementation, the average particle size of the grinding medium is in the range of about 0.4-0.7 mm; the ratio of the grinding media and the metal oxide powder in the grinder 114, in terms of weight, is in the range of about 25:1-40:1; percentage filling of the jars is in the range of about 55-65%; grinding time is in the range of about 2-6 hours.

Further, during grinding, particle size of the metal oxides may be analyzed after every pre-determined time interval using a particle size analyzer 118. In one example, the pre-determined time interval is one hour. However, it will be understood that as the milling process nears completion, the time period after which the particle size are analyzed may be smaller as compared to the initial stages of the milling process. The particle size analyzer 118 may utilize different techniques known in the art to analyze particle size, such as laser diffraction technique, acoustic spectroscopy technique, and ultrasound attenuation spectroscopy technique. In an implementation, a laser scattering particle size analyzer is used to analyze the size of particle in the grinder 114.

In one implementation, small amounts of dispersing medium 102 and the dispersant 104 are added to the mixture inside the grinder 114 after every pre-determined time interval to modify the viscosity and keep the produced nanoparticles well dispersed, i.e., to ensure that the suspension 116 is well dispersed and remains stable. As mentioned previously, the dispersant 104 coats the metal oxide particles so as to prevent agglomeration. In one example, the average size of the nanoparticles in the suspension is in the range of about 5-300 nm.

Further, in an implementation, the suspension may be diluted using the dispersing medium 102 and the dispersant 104. The diluted suspension thus prepared may be dispersed using a second disperser to evenly mix the nanoparticles of the metal oxide powder 106 and provide stability to the diluted suspension. Similar to the disperser 112, another disperser may use any physical dispersing technique known in the art for dispersing the primary mixture 100 to obtain a dispersed diluted suspension. In one implementation, to obtain the dispersed diluted suspension, the second disperser may implement an ultrasonication technique.

According to an embodiment, a method for preparing a suspension of inorganic nanoparticles is described. The method includes mixing a dispersing medium 102 with a dispersant 104 and a metal oxide powder 106 to form a primary mixture 110. In said embodiment, the dispersant 104 is selected based on interaction energy of the dispersant 104 with respect to the dispersing medium 102 and the metal oxide powder 106. The metal oxide powder 106 includes particles of at least one metal oxide and the have an average particle size greater than 100 nm. In an example, the mixing may further include dispersing the primary mixture 112 to form a slurry of the primary mixture 110. The primary mixture 102 may be dispersed using one of ultrasonication and magnetic stirring.

In an example, the interaction energy for a plurality of probable dispersants with respect to the dispersing medium 102 and the metal oxide powder 106 may be computed using a molecular modeling technique to select the dispersant 104 from the plurality of probable dispersants based on the computed interaction energies. In another example, the interaction energies may be determined experimentally.

Further, the method includes grinding, for example, wet milling, the primary mixture 110 to obtain a suspension 116. Additionally, the dispersant 104 is added to the primary mixture 110 during the grinding after predetermined time intervals. For instance, the primary mixture 110 may be ground using planetary mill.

In one implementation, the method further comprises, while grinding the primary mixture 110, periodically measuring particle size of the metal oxide powder in the primary mixture 110. Further, the primary mixture 110 may be ground till the average particle size of the metal oxide powder is less than about 100 nm.

The method may further include adding the dispersant 104 and the dispersing medium 102 to the suspension 116 to obtain a diluted suspension and dispersing the diluted suspension to obtain a dispersed diluted suspension. The diluted suspension may be dispersed using one of ultrasonication and magnetic stirring Further, the metal oxide particles in at least one of the suspension and the dispersed diluted suspension may have an average size of less than 100 nm.

In an implementation, the dispersing medium 102 is at least one of water, a polyol, a glycol, an alcohol, and an oil; the dispersant 104 is at least one of a carboxylic acid, an ester, an ether, an alcohol, sugar, a sugar derivative, a phosphate, and an amine; and the metal oxide powder 106 includes an oxide of at least one of titanium, iron, silicon, zirconium, and zinc.

Thus, the present method provides for in-situ production of the suspensions of the nanoparticles. The suspensions prepared through the methods described herein are stable for longer time durations. Typically, the suspension is stable for days or months and, if at all agglomeration takes place, it results in formation of weak agglomerates, which may be broken down with small amounts of energy, for example, using magnetic stirring or ultrasonication. Further, diluted suspensions as described herein, typically, do not agglomerate for several years. Thus, the preparation of suspension of nanoparticles using a dispersant selected based on its interaction energy with respect to the metal oxide particles facilitates preparation of stable suspensions. Further, since the present method does not involve high pressure or temperature, it provides for reduction in the cost of manufacture, and therefore may be used for commercial production of the nanoparticle suspensions.

VALIDATION AND RESULTS

The results of methods for preparing suspensions of nanoparticles have been validated using titanium dioxide and the same is indicated in the following examples. It will be understood that the examples discussed herein are only for the purpose of explanation and not to limit the scope of the present subject matter.

Example 1

In the present example, titanium dioxide powder is taken as the metal oxide powder 106, and water is taken as the dispersing medium 102. Further, based on table 1, Citric acid is selected as the dispersant 102. In said example, 10 grams (gm) of sodium citrate was dissolved in 100 milliliters (ml) water and, to this solution, 40 gm of titanium dioxide or titania powder obtained from Sumitomo Co., Japan was added to obtain the primary mixture 110. The primary mixture 110 was dispersed using magnetic stirring. Further, to grind the primary mixture 110, a planetary ball mill having four well cleaned agate jars having volume 500 ml each was used. The jars were charged with 1000 gm of 0.4-0.7 mm Zirconox grinding media, obtained from Jyothi Ceramics, Nasik, India, to make the effective volume of the jar correspond to about $\frac{2}{3}^{rd}$ of the total volume.

The dispersed primary mixture was poured into the each jar and ground at 234 rpm for one hour. A sample, 1 ml in volume, was withdrawn after every hour of grinding interval, diluted with 30 ml of aqueous citrate solution and analyzed by the particle size analyzer 118, which in the present example was Horiba LA-910, Horiba Japan. The grinding was continued for another six hours and the particle size of the ground slurry was analyzed every hour till further grinding, i.e., reduction in particle size, was observed to be minimal. Further, an additional dosage of 2 gm of citrate and 10 ml of water was added after 4 hours of grinding to modify the viscosity and keep the produced nanoparticles well dispersed. The experiment was repeated for four sets, A, B, C, and D, and the properties of the titania nanoparticles suspensions thus obtained in each of these sets are presented in Table 2.

TABLE 2

| Grinding Time | Median size (nm) Sample | | | | Fraction less than 100 nm diameter (%) Sample | | | | Specific area (m²/gm) Sample | | | | Mean size (nm) Sample | | | |
|---|---|---|---|---|---|---|---|---|---|---|---|---|---|---|---|---|
| (Hour) | A | B | C | D | A | B | C | D | A | B | C | D | A | B | C | D |
| 1 | 211 | 232 | 222 | 227 | 6.3 | 4 | 3.9 | 6.1 | 8.2 | 7.38 | 7.65 | 7.55 | 215 | 238 | 227 | 232 |
| 2 | 128 | 144 | 135 | 338 | 33.6 | 28 | 29.9 | 8.3 | 12.6 | 11.73 | 12.16 | 6.19 | 147 | 189 | 151 | 326 |
| 3 | 89 | 87 | 93 | 245 | 60.5 | 43.9 | 44.5 | 16.6 | 15.8 | 16.18 | 15.1 | 7.09 | 113 | 108 | 118 | 257 |
| 4 | 82 | 81 | 85 | 84 | 73 | 77 | 64.5 | 69.1 | 17.3 | 17.71 | 15.64 | 16.92 | 99 | 95 | 873 | 100 |
| 5 | 76 | 76 | 79 | 79 | 87.9 | 87 | 89 | 87.9 | 19.3 | 19.16 | 20.57 | 20.43 | 83 | 85 | 79 | 79 |
| 6 | 74 | 73 | 74 | 78 | 92.7 | 93.2 | 92.4 | 90.3 | 19.6 | 20.17 | 19.92 | 20.77 | 83 | 78 | 79 | 78 |

As it can be observed from table 2, median size and mean size of the particles of titanium dioxide obtained after milling is below 100 nm. Further, fraction of particles with diameter less than 100 nm is greater than 90%.

Example 2

Further, to check for the stability of the suspension, the suspension was monitored with respect to time. For the purpose, a sample of the primary suspension obtained after 4 hrs of grinding by the procedure described in example 1 was stored for 30 days at room temperature and pressure. The particles in this original sample had $d_{50}$ size of 80 nm and 92.3% particles were finer than 100 nm. The $d_{50}$ particle size represents the median or the 50th percentile of the particle size distribution as measured by volume. The $d_{50}$ particle size is a value on the particle size distribution such that 50% of the particles have a volume of this value or less. The stored sample was diluted with citric acid-water and ultrasonicated for 4 minutes and was subjected to particle size analysis. The sample showed some agglomeration and 41.2% fraction was below 100 nm.

Figure 2A:
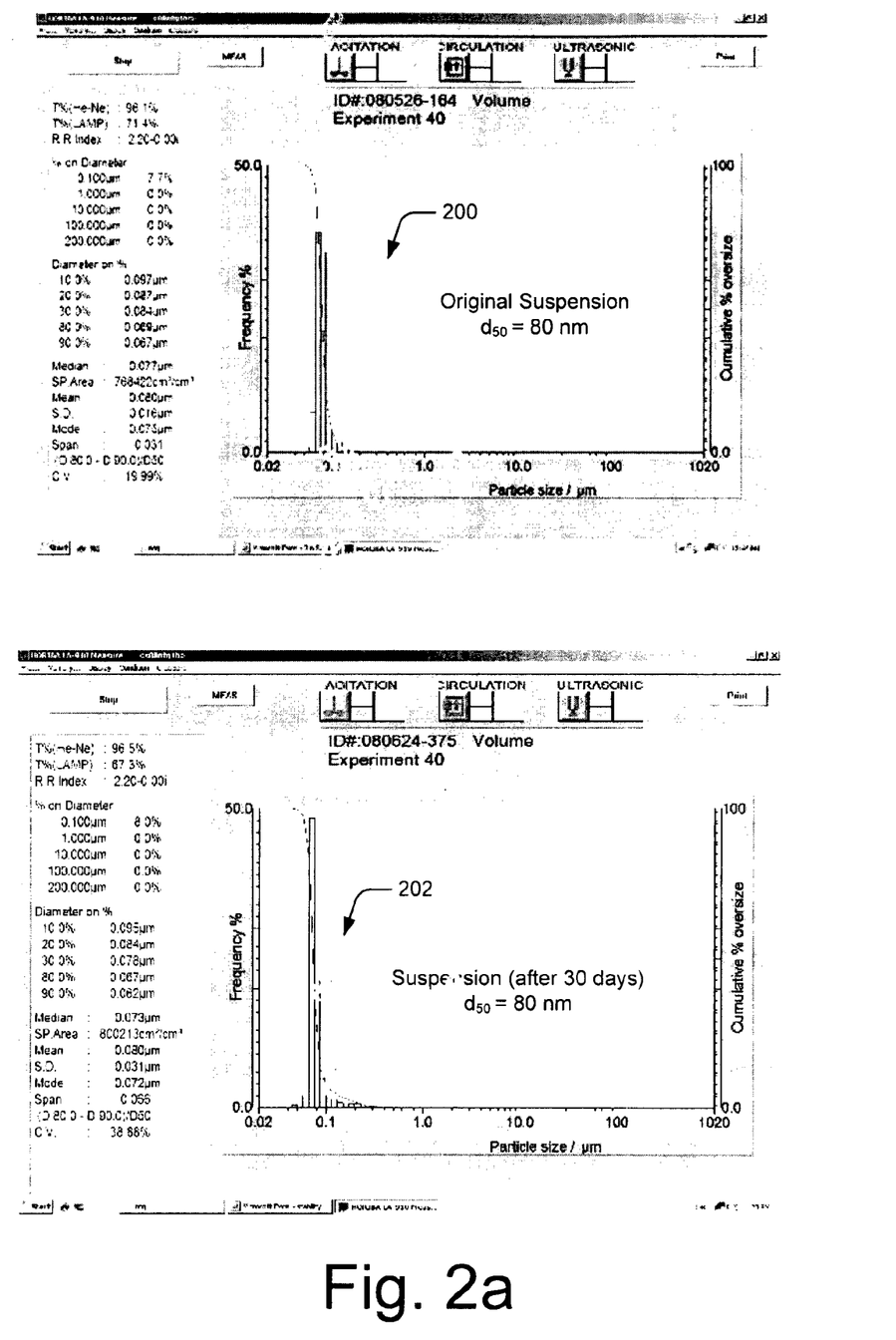
FIG. 2a illustrates particle size analysis graphs for the suspension of nanoparticles, according to an embodiment of the present subject matter.

Additionally, to check if the agglomerates were soft or weak, the sample was reground again for 1 hour under similar condition as described in example 1 and analyzed for particle size distribution. It may be observed from particle size analysis graphs 200 and 202 illustrated in FIG. 2a, that the suspensions regained its original status and particles size distribution was almost identical to that of original suspension, i.e., suspension had $d_{50}$ as 80 nm and 92.0% particle finer than 100 nm.

Further, in another case, the sample, with $d_{50}$ size of 80 nm and having 92.3% particles finer than 100 nm, obtained after 4 hrs of grinding by the procedure described in example 1, was diluted to 5 wt % nanotitania in water and diluted sample was stored further for 3 years at room temperature and pressure and analyzed for particle size distribution. The suspension, which was stored for 3 years, had $d_{50}$ size of 81 nm and having 92% particles were finer than 100 nm. Thus, the suspension showed similar particles size distribution to that of original suspension. Thus, it can be seen from the above examples that method described herein provided for preparation of suspensions of nanoparticles that are stable for several years.

Example 3

In order to study the effect of various dispersants and verify the selection of a dispersant based on the interaction energy, example 1 was repeated with Polyacrylic acid and carboxymethyl cellulose as dispersants, titanium dioxide as metal oxide powder, and water as the dispersing medium.

Figure 2B:
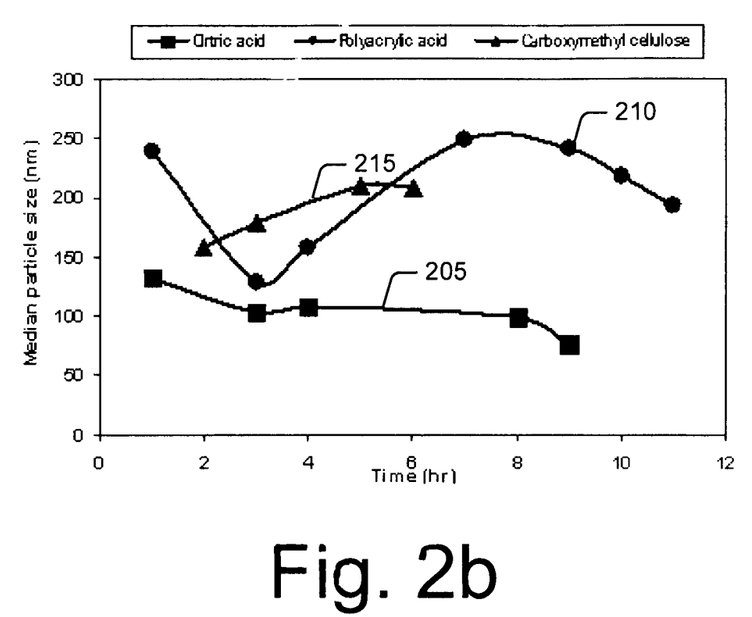
FIGS. 2b, 2c, and 2d illustrate effect of various dispersants on particle size, surface area, and fraction of particles having size less than 100 nm, according to an embodiment of the present subject matter.

FIG. 2b illustrates effect of Citric acid, Polyacrylic acid, and Carboxymethyl cellulose on size of titanium dioxide particles with respect to grinding time. As shown, curve 205 depicts effect of Citric acid, curve 210 depicts effect of Polyacrylic acid, and curve 215 depicts effect of Carboxymethyl cellulose on particle size. From FIG. 2b, it can be observed that median particle size after 9 hours of grinding is about 60 nm with Citric acid as the dispersant, while median particle size after 11 hours of grinding is about 200 nm with Polyacrylic acid as the dispersant and median particle size after 6 hours of grinding is about 210 nm with Carboxymethyl cellulose as the dispersant.

Figure 2C:
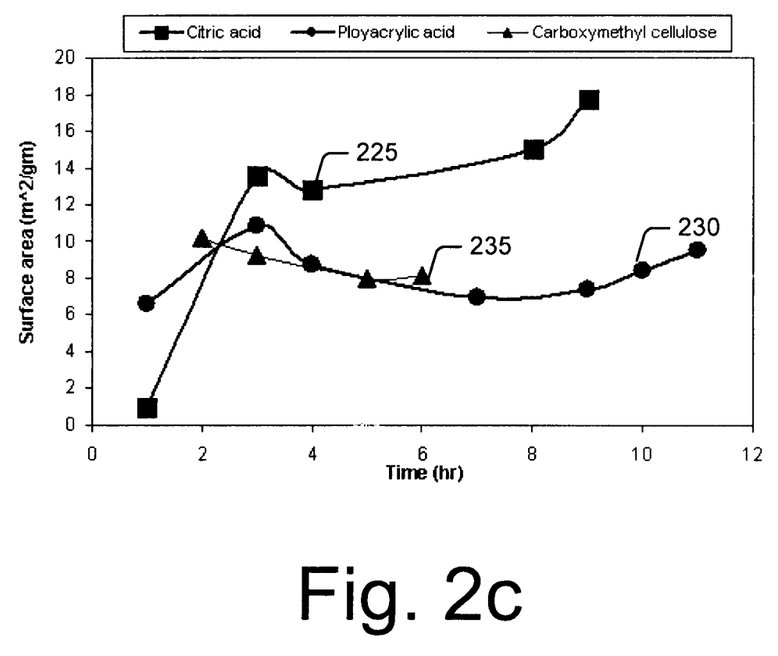

Similar to FIG. 2b, FIG. 2c illustrates effect of Citric acid, Polyacrylic acid, and Carboxymethyl cellulose on surface area of titanium dioxide particles with respect to grinding time. As shown, curve 225 depicts effect of Citric acid, curve 230 depicts effect of Polyacrylic acid, and curve 235 depicts effect of Carboxymethyl cellulose on surface area of the titanium dioxide particles. From FIG. 2c, it can be observed that surface area of the particles after 9 hours of grinding is about 17 $m^2/gm$ with Citric acid as the dispersant, while surface area of the particles after 6 hours of grinding is about 9 $m^2/gm$ with Polyacrylic acid and surface area of the particles after 11 hours of grinding is about 9 $m^2/gm$ with Carboxymethyl cellulose as the dispersant.

Figure 2D:
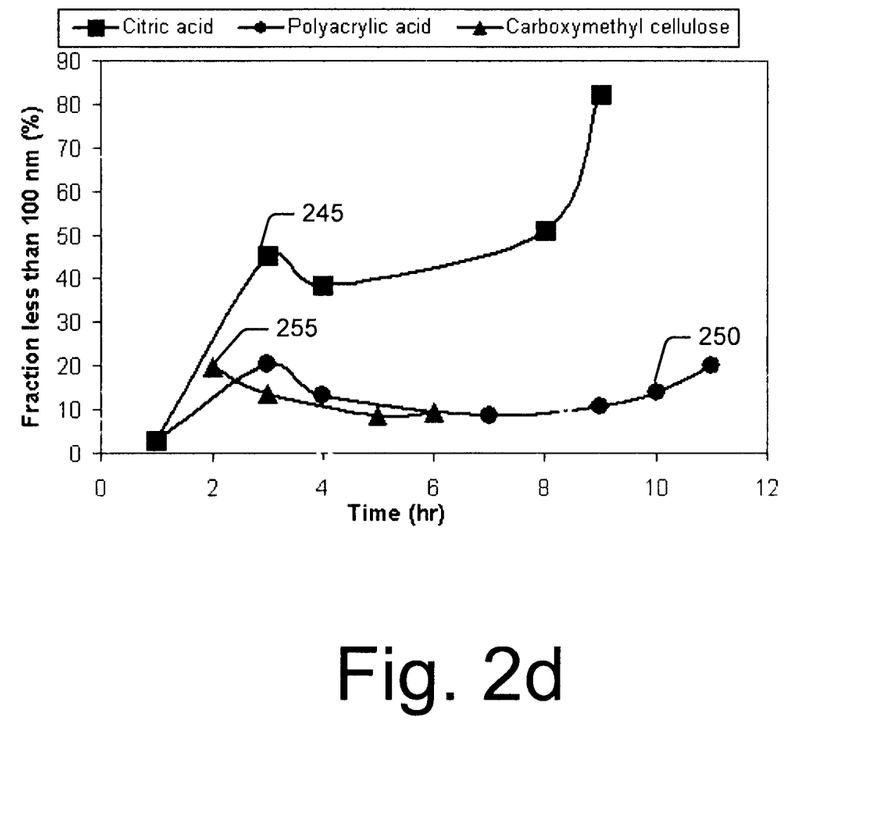

Likewise, FIG. 2d illustrates various plots depicting variations in fraction of particles having size less than 100 nm with respect to grinding time when Citric acid, Polyacrylic acid, and Carboxymethyl cellulose are used as dispersants. As shown, curve 245 depicts variation in fraction of titanium dioxide particles having size less than 100 nm when Citric acid is used as a dispersant, curve 250 depicts variation in fraction of titanium dioxide particles having size less than 100 nm when Polyacrylic acid is used as a dispersant, and curve 255 depicts variation in fraction of titanium dioxide particles having size less than 100 nm when carboxymethyl cellulose is used as a dispersant. As it can be observed from FIG. 2d, the fraction of titanium dioxide particles below 100 nm is about 90% after about 9 hours of grinding when Citric acid is used as a dispersant, while the fraction is 20% after about 11 hours grinding when Polyacrylic acid and the fraction is about 10% after 6 hours of grinding when Carboxymethyl cellulose is used.

Thus, FIG. 2b, FIG. 2c, and FIG. 2d illustrate that the Citric acid as a dispersant yields the better results as compared to Polyacrylic acid and Carboxymethyl cellulose. Accordingly, it may be understood that selection of a dispersant based on its interaction energy with respect to the metal oxide powder and dispersing medium facilitates production of stable suspension of nanoparticles. Additionally, it can be seen that selection of right dispersant also provides for formation of nanoparticles during grinding.

Example 4

The described method was also checked for a new combination of dispersant and dispersing medium. For the purpose, example 1 was repeated with ethyl alcohol as the dispersing medium 102. Based on table 3, p-hydroxybenzoic acid obtained from SD Fine Chem Ltd., India was selected as the dispersant 104.

TABLE 3

| Dispersant | Interaction Energy (Kcal/mol) |
|---|---|
| p-hydroxybenzoic acid | −58.65 |
| Glycerol trioleate | −45.50 |
| Sorbita oleate (Span −80) | −33.59 |
| Phosphoric acid tris 2-ethylhexyl ester | −26.74 |
| Methyl ester of dodecyliminobismethylene phosphonic acid | −12.25 |
| Monovalerate of 12-hydroxy stearic acid | −0.52 |
| Dodecyl amine | −0.16 |

Further, the properties of the non-aqueous titania nanoparticles suspensions thus obtained are presented in Table 4:

TABLE 4

| Grinding Time (Hour) | Median size (nm) | Fraction less than 100 nm diameter (%) | Specific area ($m^2/gm$) | Mean size (nm) |
|---|---|---|---|---|
| 2 | 226 | 1.2 | 7.14 | 345 |
| 4 | 196 | 3.6 | 7.89 | 245 |
| 5 | 79 | 88.3 | 20.57 | 79 |

Thus, as it can be seen that fraction of particles having diameter less than 100 nm is almost 90% and the mean size of the particles is about 79 nm.

Example 5

Similar to example 3, the described method was again checked for a new combination of dispersant and dispersing medium. For the purpose, example 1 was repeated with p-Span-80 Fluka, USA obtained from SD Fine Chem Ltd., India as the dispersant 104 and n-butyl acetate as the dispersing medium 102. The properties of the non-aqueous titania nanoparticles suspensions thus obtained are presented in Table 5.

TABLE 5

| Grinding Time (Hour) | Median size (nm) | Fraction less than 100 nm diameter (%) | Specific area ($m^2$/gm) | Mean size (nm) |
|---|---|---|---|---|
| 2 | 106 | 44.1 | 13.41 | 138 |
| 3 | 109 | 34.1 | 13.61 | 120 |
| 4 | 68 | 93.7 | 22.80 | 74 |

Thus, as it can be seen from table 4 that the fraction of particles having diameter less than 100 nm is almost 94% and the mean size of the particles is about 74 nm.

Although implementations for preparation of stable suspensions of nanoparticles has been described in language specific to structural features and/or methods, it is to be understood that the appended claims are not necessarily limited to the specific features or methods described. Rather, the specific features and methods are disclosed as examples and implementations for preparing the stable suspensions.

I/we claim:

1. A method for preparing a suspension of metal oxide nanoparticles with an average size of less than 100 nm, the method comprising:
    mixing a dispersing medium with a dispersant and a metal oxide powder with a particle size of about 0.1 to 100 microns to form a primary mixture, wherein the primary mixture includes about 10-40 wt % of the metal oxide powder, wherein the dispersant is sodium citrate or citric acid, and wherein the dispersing medium is water;
    dispersing the primary mixture to form a slurry of the primary mixture;
    grinding the slurry of the primary mixture at 234 revolutions per minute (rpm) or at about 420 rpm to obtain a suspension, wherein during the grinding, a further amount of the dispersant and the dispersing medium are added to the slurry of primary mixture at predetermined time intervals;
    adding a further amount of the dispersant and the dispersing medium to the suspension to obtain a diluted suspension; and
    dispersing the diluted suspension to obtain dispersed diluted suspension.

2. The method as claimed in claim 1, wherein the dispersing of the primary mixture and the diluted suspension is performed by ultrasonication or magnetic stirring.

3. The method as claimed in claim 1, wherein the grinding the primary mixture comprises wet milling the primary mixture to obtain the suspension.

4. The method as claimed in claim 1 wherein, during the step of grinding the slurry of the primary mixture, the method further comprises the step of periodically measuring particle size of metal oxide particles using a particle size analyzer, and wherein the primary mixture is ground until the average particle size of the metal oxide particles is less than about 100 nm.

5. The method as claimed in claim 1, wherein the metal oxide powder includes an oxide of at least one of titanium, iron, silicon, zirconium, and zinc.

6. The method as claimed in claim 1, wherein the primary mixture includes about 30-40 wt % of the metal oxide powder.

7. The method as claimed in claim 4, wherein the particle size analyzer analyzes particle size using laser diffraction, acoustic spectroscopy, and ultrasound attenuation spectroscopy.

\* \* \* \* \*